United States Patent [19]
Fricke

[11] Patent Number: 5,924,261
[45] Date of Patent: Jul. 20, 1999

[54] METHOD AND APPARATUS FOR DAMPING STRUCTURAL VIBRATIONS

[75] Inventor: J. Robert Fricke, Belmont, Mass.

[73] Assignee: Massachusetts Institute of Technology, Boston, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/911,927

[22] Filed: May 15, 1997

Related U.S. Application Data

[63] Continuation of application No. 08/662,167, Jun. 12, 1996, Pat. No. 5,775,049
[60] Provisional application No. 60/000,205, Jun. 14, 1995.

[51] Int. Cl.[6] .............................. E04C 3/46; E04B 1/98; E04H 9/02
[52] U.S. Cl. ...................... 52/720.1; 52/167.6; 52/167.8; 52/729.1; 52/738.1; 52/742.13; 52/745.19
[58] Field of Search ............................... 52/729.1, 738.1, 52/167.1, 167.8, 742.1, 742.13, 745.19, 720.1, 167.6

[56] References Cited

U.S. PATENT DOCUMENTS

| | | |
|---|---|---|
| 1,894,276 | 1/1933 | Lampton . |
| 2,862,686 | 12/1958 | Bartlett . |
| 3,586,460 | 6/1971 | Toner . |
| 4,019,301 | 4/1977 | Fox . |
| 4,057,250 | 11/1977 | Kuban . |
| 4,182,512 | 1/1980 | Kuebler . |
| 4,453,887 | 6/1984 | Schucker . |
| 4,566,231 | 1/1986 | Konsevich . |

(List continued on next page.)

FOREIGN PATENT DOCUMENTS 56-24201  2/1981  Japan .

OTHER PUBLICATIONS 08,974,130 Fricke.
09,063,702 Fricke.
"Damping Hollow Tubular Structures with 'Lightweight' Viscoelastic Spheres," House, *Proceedings of the ACS Division of Polymeric Materials: Science and Engineering 60*, Dallas, Texas (Spring 1989).
"The Effective Elastic Moduli of a Randon Packing of Spheres," Walton, *J. Mech. Phys. Solids 35(2)*, 213–226 (1987).
"Truss Research, M.I.T. Department of Ocean Engineering," *Review Meeting CDNSWC*, Cambridge, MA (Mar. 16, 1994).
"M.I.T. Bead Damping Experiments" (Jun. 15, 1994).
"ARPA/ONR Damping of Lightweight Structures" (Jun. 15, 1994).
"Experimental Effort: Structural Acoustics & Hydroacoustics Research Branch," Warwick (Jun. 15, 1994).
"An Evaluation of Polyethylene Beads as a Damping Treatment for Tubular Truss Structures," Warwick et al., *Carderock Division Naval Surface Warfare Center*, Bethesda, Maryland (Oct. 1994).

*Primary Examiner*—Christopher Kent
*Attorney, Agent, or Firm*—Choate, Hall & Stewart

[57] ABSTRACT

The damped structural member includes a structural member and granular material in intimate contact with the member. In one embodiment the granular material is lightweight and has a bulk specific gravity of less than 1.5. When low weight is important, the granular material has a bulk specific gravity of less than or equal to one. The particles of the granular material are also in intimate contact with one another. The granular material may be substantially non-viscoelastic. Preferred granular material is low density polyethylene and glass microspheres. The granular material fills hollow structural members or is placed into intimate contact with open structural members. The lightweight fill effectively damps vibrational modes without excessively increasing the weight of the structural member.

32 Claims, 18 Drawing Sheets

U.S. PATENT DOCUMENTS

| | | |
|---|---|---|
| 5,016,602 | 5/1991 | Mizek . |
| 5,020,644 | 6/1991 | Novoa . |
| 5,098,098 | 3/1992 | Petralia . |
| 5,180,163 | 1/1993 | Lanctot et al. . |
| 5,195,930 | 3/1993 | Hirano et al. . |
| 5,197,707 | 3/1993 | Kohan . |
| 5,327,733 | 7/1994 | Boolchand et al. . |
| 5,345,177 | 9/1994 | Sato et al. . |
| 5,400,296 | 3/1995 | Cushman et al. . |
| 5,454,562 | 10/1995 | Sommer . |
| 5,772,540 | 6/1998 | Kuebler . |
| 5,775,049 | 7/1998 | Fricke ................................ 52/720.1 |

METHOD AND APPARATUS FOR DAMPING STRUCTURAL VIBRATIONS

This application is a continuation of U.S. Ser. No. 08/662,167, now U.S. Pat. No. 5,775,049, filed Jun. 12, 1996, which in term claims benefit of the priority of U.S. provisional application No. 60/000,205, filed Jun. 14, 1995.

This invention was made with government support under Grant Number N00014-93-1-1219 awarded by the Navy. The government has certain rights in the invention.

BACKGROUND OF THE INVENTION

Vibration in built-up structures causes problems ranging from radiation of acoustic noise to damage to sensitive instrumentation. Built-up structures are any composite of beams, plates, joints and other structural components connected to form a nominal single unit. Examples of built-up structures are bridges, submarines and automobiles. All of these structures suffer from vibrations to one degree or another. One kind of built-up structure is the space frame or truss. Space frames or trusses are used in a variety of applications from off-shore structures to bridges to antenna platforms. Trusses are composed of beam members, which may be closed, as for example box or tubular beams, or open, as for example I-beams. In either case, structural vibration of the base structure is caused most commonly by external forcing from attached equipment or fluid flow. In many structural applications it is desirable to reduce the level of such vibrations. In the context of a submarine, to cite a single example, the desire to minimize vibrations stems from the need to reduce acoustic radiation into the water around the submarine so as to reduce the probability of detection.

The use of granular material to effect structural damping is well known. Sand and lead shot have been used for some time to provide such damping. For example, sand is used to fill the hollow spaces of tubular beams. Sand and lead shot, though effective in providing damping primarily through a mass loading effect, are very heavy so that their use extracts a high weight penalty. For example, sand has a bulk specific gravity of not less than 1.5 and lead shot has a bulk specific gravity of approximately 8.

It has also been suggested to provide structural damping using polymeric viscoelastic spheres. Viscoelastic materials absorb energy when they are deformed. See, J. R. House, "Damping Hollow Tubular Structures with Lightweight Viscoelastic Spheres," *Proceedings of the ACS Division of Polymeric Materials: Science and Engineering,* 60, Spring Meeting 1989, Dallas, Tex. In this article, House proposes the use of spheres molded from an epoxy resin.

The prior art structural damping techniques thus involve granular material having either significant mass relative to the host structure such as sand or lead shot, or high intrinsic damping characteristics such as viscoelastic spheres. While viscoelasticity and mass are useful, neither are essential as the present invention will make clear.

SUMMARY OF THE INVENTION

The method for damping vibration in a structure according to one aspect of the invention includes placing granular material into intimate contact with the structure. Particles of the granular material are also in intimate contact with each other. The granular material is substantially non-viscoelastic in one embodiment. In another embodiment, the granular material is lightweight having a bulk specific gravity less than one. In applications in which low weight is important, the granular material has a bulk specific gravity less than or equal to one. Preferred materials are low density polyethylene and glass microspheres. Both of these materials are substantially non-viscoelastic and both have bulk specific gravities less than one. Another suitable fill is a material with a highly dendritic structure such that the dendrites are in intimate contact with one another. The structure to be damped may be a hollow member such as closed beams having, for example, box or tubular sections, as well as open beams, for example, I-beams. For use with an open beam, the method further includes confining the granular material fill or beads for intimate contact with the open beam. Since the fill is lightweight, it may be confined for contact with the beam with covering panels which need not be structural members. In each case the particles of the granular material are in intimate contact with one another.

In another aspect, the present invention is a damped structural member including a structural member to be damped and granular material in intimate contact with the member. In one embodiment, the member is hollow and the granular material fills the hollow member. In another embodiment, the member is an open member or beam and structure is provided for maintaining the granular material in intimate contact with the open member. The granular material, in one embodiment, is lightweight, having a bulk specific gravity less than one. In another embodiment, the granular material is substantially non-viscoelastic.

The granular materials of the invention may be engineered materials for which one has control of size, shape, material properties and composition. For engineered materials, these properties are carefully controlled and customized to meet performance criteria for specific applications. These granular materials are lightweight materials of which polyethylene beads and glass micro-spheres are just two examples. These engineered granular materials are placed inside structural components either at construction time or poured in at a later time. When the surrounding structure is excited into vibration the enclosed granular fill material is excited as well. Unlike prior art granular material, the materials of the present invention do not have significant mass relative to the host structure, nor do they necessarily have high intrinsic damping as with viscoelastic materials.

The structural damping method and apparatus of the invention offers numerous advantages over the prior art. It is relatively easy to pour the granular material into existing structures if retrofitting is required for remediation of vibration problems. The lightweight nature of the granular material will not cause significant structural loading in most cases. Further, if the damping treatment is considered during the design stages, there is not a significant increment in static load bearing requirements. Hence, only modest changes in the structural design are required with respect to that of a design without treatment.

As set forth above, the damping treatment of the invention can be used with closed beams, e.g., box or tubular sections, as well as with open beams, e.g., I-beams. In the latter case, only lightweight covering panels are needed to contain the granular treatment in the vicinity of the structural beam member. Since the fill is lightweight, the covering panels do not need to be structural members. Suitable lightweight materials for practice of the invention include, but are not limited to, polyethylene pellets and glass microspheres. Polyethylene pellets may be preferred because of the ease of handling and because of slightly better performance with respect to the glass microspheres. Glass microspheres may be preferred because they have a bulk specific gravity in the range of approximately 0.05–0.1 which is at least an order of magnitude less than the specific gravity of sand (not less than 1.5) and two orders of magnitude less than that of lead shot (eight). Because the treatment technique of the invention does not require high density or material viscoelasticity, the choice of materials is quite broad. Such latitude opens the range of material options to include those that simultaneously offer effective damping as well as other desirable traits such as environmental friendliness, ease of handling, cost, etc. Further, since the fill may be an engineered material, the particle shape, size, and material properties may be tailored to meet specific performance criteria. As will be discussed in more detail below, the damping treatment of the invention is more effective at lower frequencies than conventional treatments such as constrained layer damping. Thus, for a given level of effort in damping treatment, the lightweight granular fill permits attenuation of vibrations at lower frequencies, which are often troublesome.

Applications for the technology of the present invention are many. For example, the invention can be used to damp launch induced vibrations in sensitive instruments carried aboard launch vehicles. The invention may also be used for damping space frame structures on satellites that are prone to vibrations due to the lightness of the structure and the lack of acoustic radiation damping in space. Such space frames must be stable for accurate pointing of various instruments including radio frequency (rf) antennas, telescopes, cameras, etc. Other applications of the invention include almost any structure prone to vibrations such as automobiles, trucks, railroad cars, ships and aircraft. A variety of fixed installations also suffer from troublesome vibrations on occasion, depending upon the design, including bridges, buildings, off-shore platforms, antenna platforms, radio towers, and electrical transmission line towers. In both the mobile and fixed applications, the availability of the present invention, by providing an effective, lightweight damping treatment, opens the door to new designs which are not now possible due to problems with structural vibrations.

DESCRIPTION OF PREFERRED EMBODIMENT

The theory on which the present invention is based will now be discussed briefly. The fundamental mechanism that results in damping is that the compressional wave speed in granular materials is much lower than the wave speed in a solid of the same material. See K. Walton, "The effective elastic moduli of a random packing of spheres," *Journal of the Mechanics and Physics of Solids,* 35, 213–236 (1987). With this low wave speed the wave length in the granular matrix is correspondingly low for a given frequency since $\lambda=c/f$. With a low sound speed several damping mechanisms, which normally have a small effect, can come into play. These mechanisms include the small intrinsic attenuation within the solid pieces of granular material, the friction between pieces of granular material, and the non-linear hysteresis in the pieces of granular material arising from deformation during the wave propagation process. Together these mechanisms attenuate the vibrations because many wavelengths occupy a physically small space and the attenuation is a strong function of wavelength, shorter ones being attenuated more readily. The present invention does not rely on the mass loading effect as known in the prior art, nor does it rely primarily on the high intrinsic attenuation of bulk viscoelastic polymer materials.

The granular material or the "beads" of the invention do not necessarily need to be spherical in shape. What is important is that the material be granular so that the bulk wave speed is low. With a low wave or sound speed and hence a small wavelength, any small intrinsic attenuation in the material, non-linear hysteresis due to deformation of the material, or frictional losses between grains of the material will provide effective damping of the structural vibration.

EXAMPLE 1

The present invention has been tested using glass microspheres as the bead damping treatment. The microspheres used were 3M Scotchlite Glass Bubble, K Series, Bubble Type K1. These microspheres are hollow and have a bulk density in the range of 50–100 kg/m$^3$, about 5–10% of that of water. The microspheres are very small with diameters on the order of 177 μm. Further, glass with a loss factor of $O(10^{-3})$ is not generally considered to be a viscoelastic material in the frequency and temperature ranges of interest. Nevertheless, as will be seen, experiments using a slurry of glass microspheres produced damping of 3–15 dB for the resonant peaks in a tubular beam structure. Most peaks were damped by at least 10 dB. Mass and intrinsic damping would augment the total damping, but these characteristics are not essential.

Figure 1:
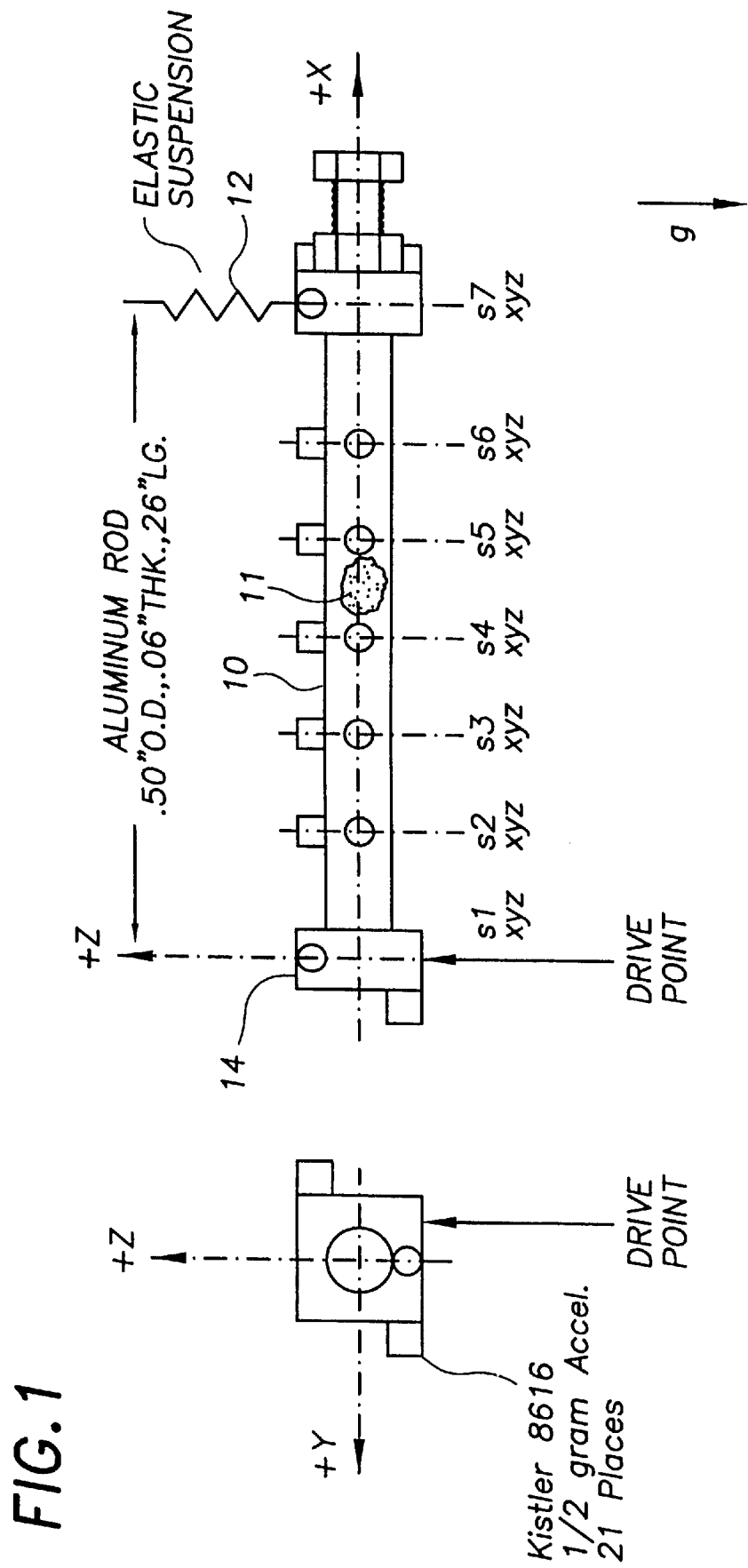
FIG. 1 is a schematic illustration of test apparatus for testing the damping effectiveness of the invention.
Figure 2:
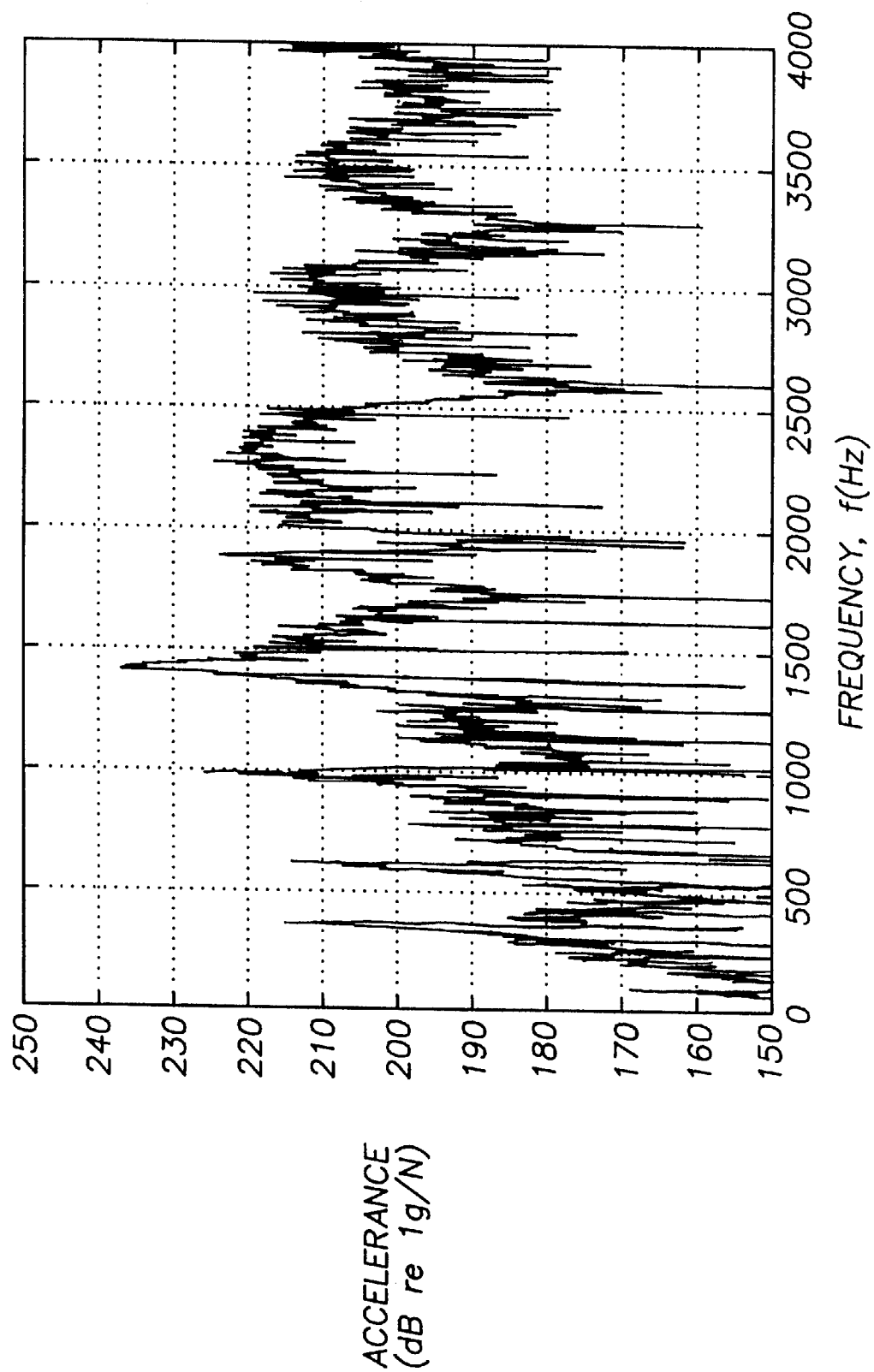
FIG. 2 is a graph of accelerance versus frequency for an undamped beam.
Figure 3:
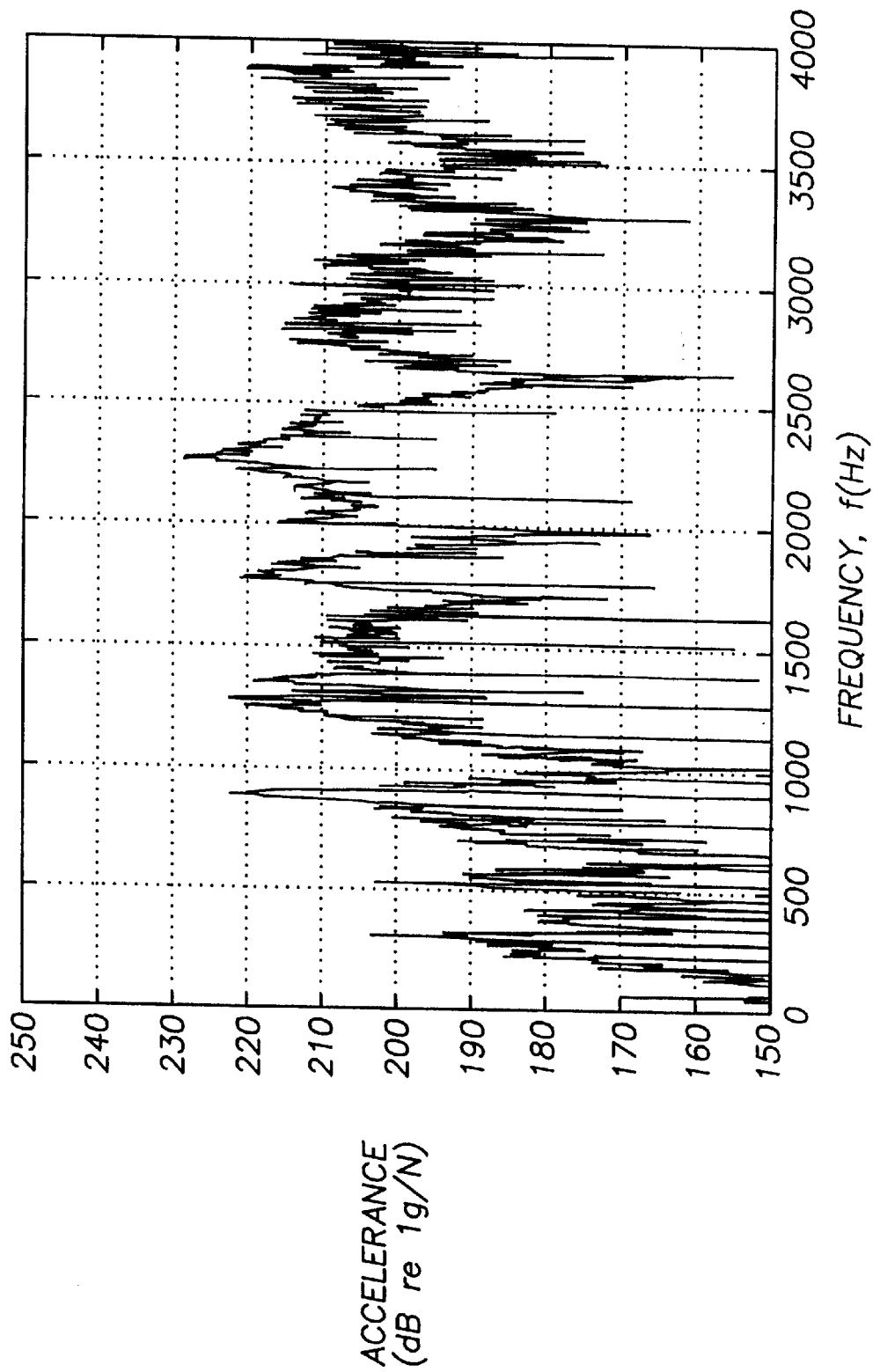
FIG. 3 is a graph of accelerance versus frequency for a damped beam.

The experimental set up for Example 1 is shown in FIG. 1. A hollow, tubular aluminum beam 10 has a 0.5 inch outside diameter, a 0.06 inch wall thickness, and is 26 inches long. The beam was suspended by means of an elastic suspension 12 and driven at a drive point 14. The drive mechanism was a 5 newton shaker producing 0–4,000 Hz broadband noise. FIG. 2 is a graph of accelerance (acceleration normalized by the applied force) versus frequency for an undamped beam 10. That is, beam 10 was not filled with the microspheres. The acceleration was measured at position S2Z with a ½ gm, 4 mv/g accelerometer and the data were collected on a 48-channel Zonics data acquisition system. Accelerance was determined from the ratio of cross-spectra and auto-spectra. Thereafter, the hollow beam 10 was filled with the glass microspheres 11 and the beam 10 was driven once again. FIG. 3 shows the corresponding data for the damped beam accelerance. It is of interest to note the height of the resonant peaks with and without the damping treatment. The microsphere-loaded beam provided about 10 dB of vibration attenuation at the resonant peaks.

EXAMPLE 2

This experiment utilized a low density polyethylene (LDPE) as a granular material for damping evaluation. The experiment was carried out at Carderock Division Naval Surface Warfare Center in Bethesda, Md. The particular low density polyethylene was Chevron LDPE1117B bead material used industrially as the raw material for various injection molding processes with a bulk weight density on the order of one-third to one-quarter that of sand. The beads were roughly spherical with a diameter of approximately 3 mm. The properties of this material are shown in Table 1.

TABLE 1

Materials Properties & Specifications of LDPE 1117B

| | |
|---|---|
| Density | 57.4 lbs/cuft |
| Modulus (3 pt. secant) | $22 \times 10^6$ psi |
| Modulus (3 pt. tangent) | $32 \times 10^6$ psi |
| Flexural Stiffness | $21 \times 10^6$ psi |
| Elongation @ Break (%) | 630 |
| Tensile Strength @ Yield | 1380 psi |
| ASTM: Type/Class/Category | 1/A/3 |

Figure 4:
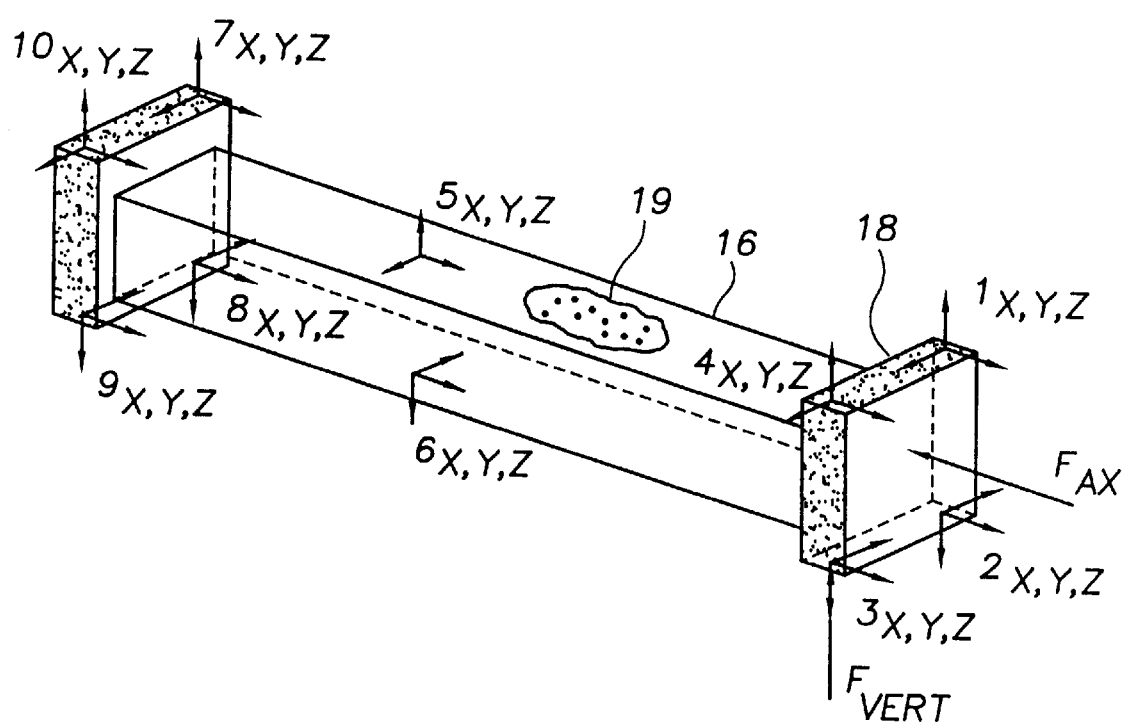
FIG. 4 is a schematic illustration of another experimental test rig.

For initial testing, a single beam section, representative of a typical full scale truss element was used. A 6×6×¼ inch box section 8 feet long was chosen for the fixture. The ends of the box section were welded to 8×8×2 inch thick steel plates primarily for the purpose of providing appropriate fixity at the ends of the beam for the local cross-sectional modes. The end plates also provided a convenient point for applying excitations and measuring response, particularly in the global modes of vibration. One of the end plates was drilled with a 4-inch threaded hole through which various fill materials could be inserted. A 4-inch diameter threaded cap, 2inches thick, was installed in the hole as a plug. This plug could be further threaded into the end cap to apply pressure to the fill material if desired. The fixture was suspended by a low frequency bungee suspension to approximate a free-free boundary condition. The rigid body suspension system modes of the fixture were in the range of 1–3 Hz, ensuring that the dynamics of the suspension system would not affect the flexible modal response of the beam. FIG. 4 is a schematic representation of the test set up. Excitation forces were applied to a beam 16 in two orientations to excite axial, bending and torsional mode types. Axial modes were driven through an axially-oriented force input located along the center line of the fixture and applied on the end plate. The bending and torsional modes were simultaneously excited through an off-center vertical drive on the end plate 18. Forces were measured using a single axis force gauge directly attached to the structure via a threaded stud and attached to a shaker through a "stinger" rod to minimize the contribution of unmeasured moment inputs to the fixture. Tri-axial acceleration measurements were obtained at each corner of the two end plates as well as the top and bottom surfaces of the box beam 16 at a point 8 inches from the mid-point of the fixture. These response locations were chosen to provide a means of visualizing the characteristic displacements associated with the various modes of the fixture, allowing the damping estimates to be characterized by mode type, e.g., compressional, bending or torsional.

Figure 5:
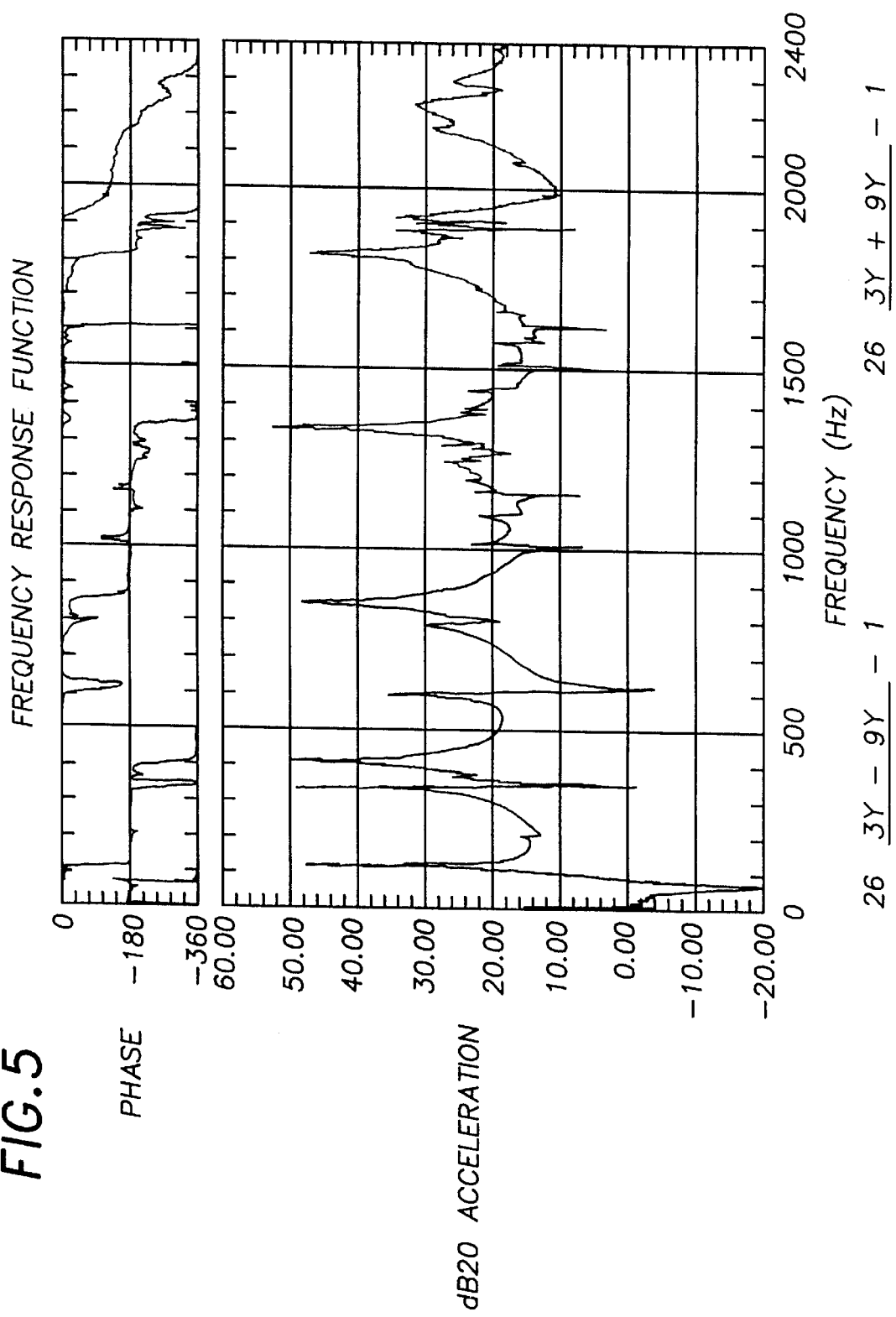
FIGS. 5–8 are graphs of transfer accelerance function for an undamped structure.
Figure 6:
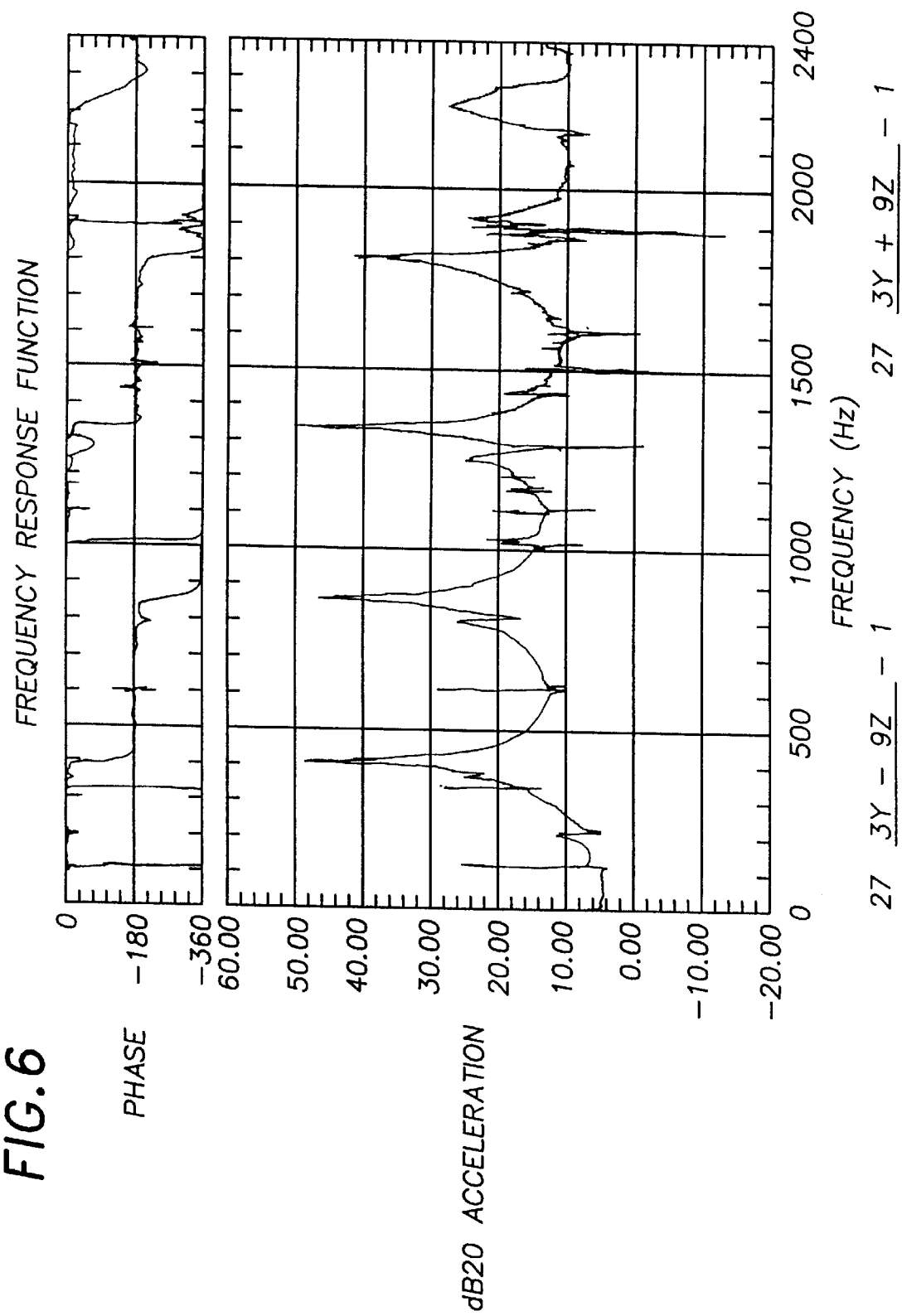
Figure 7:
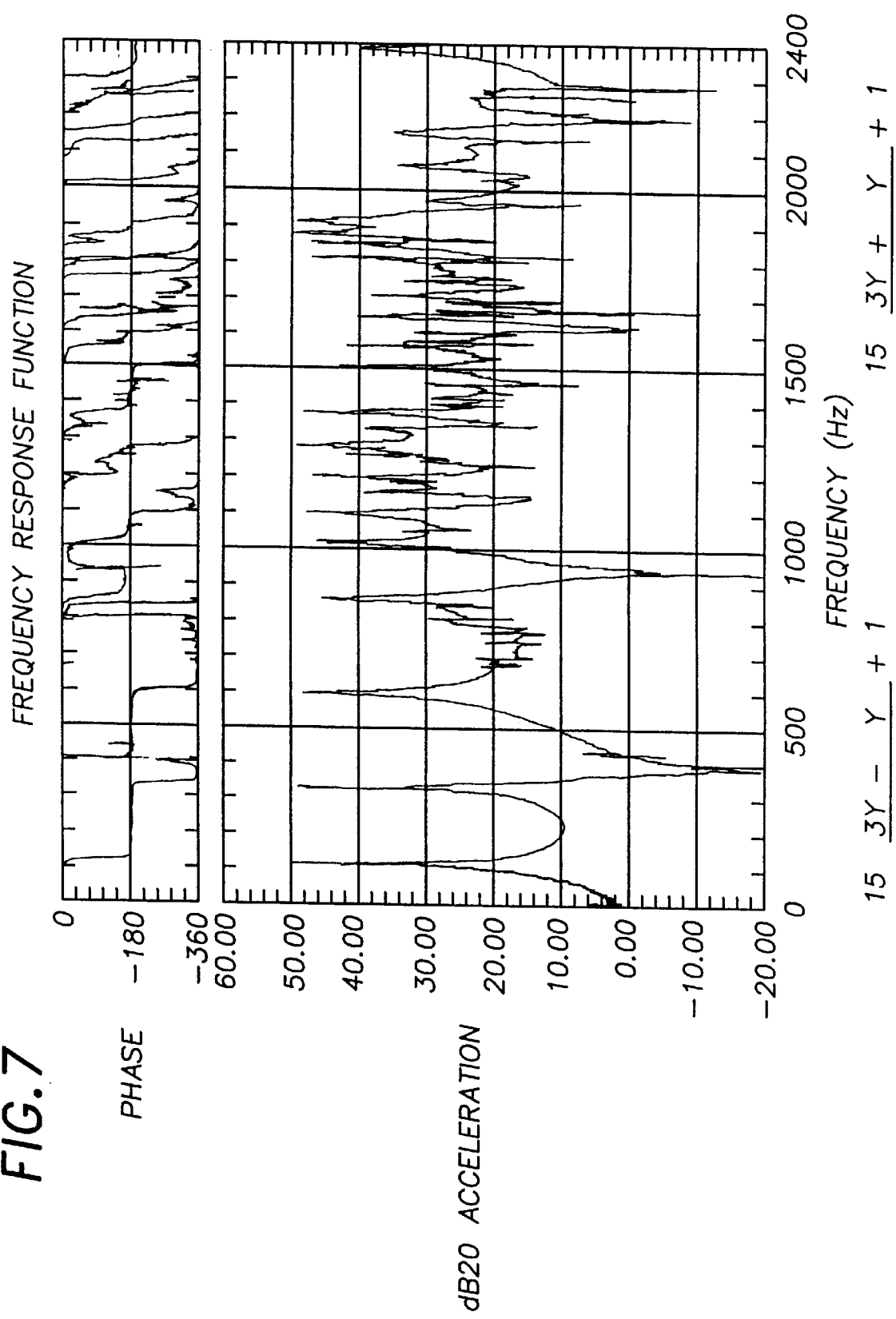
Figure 8:
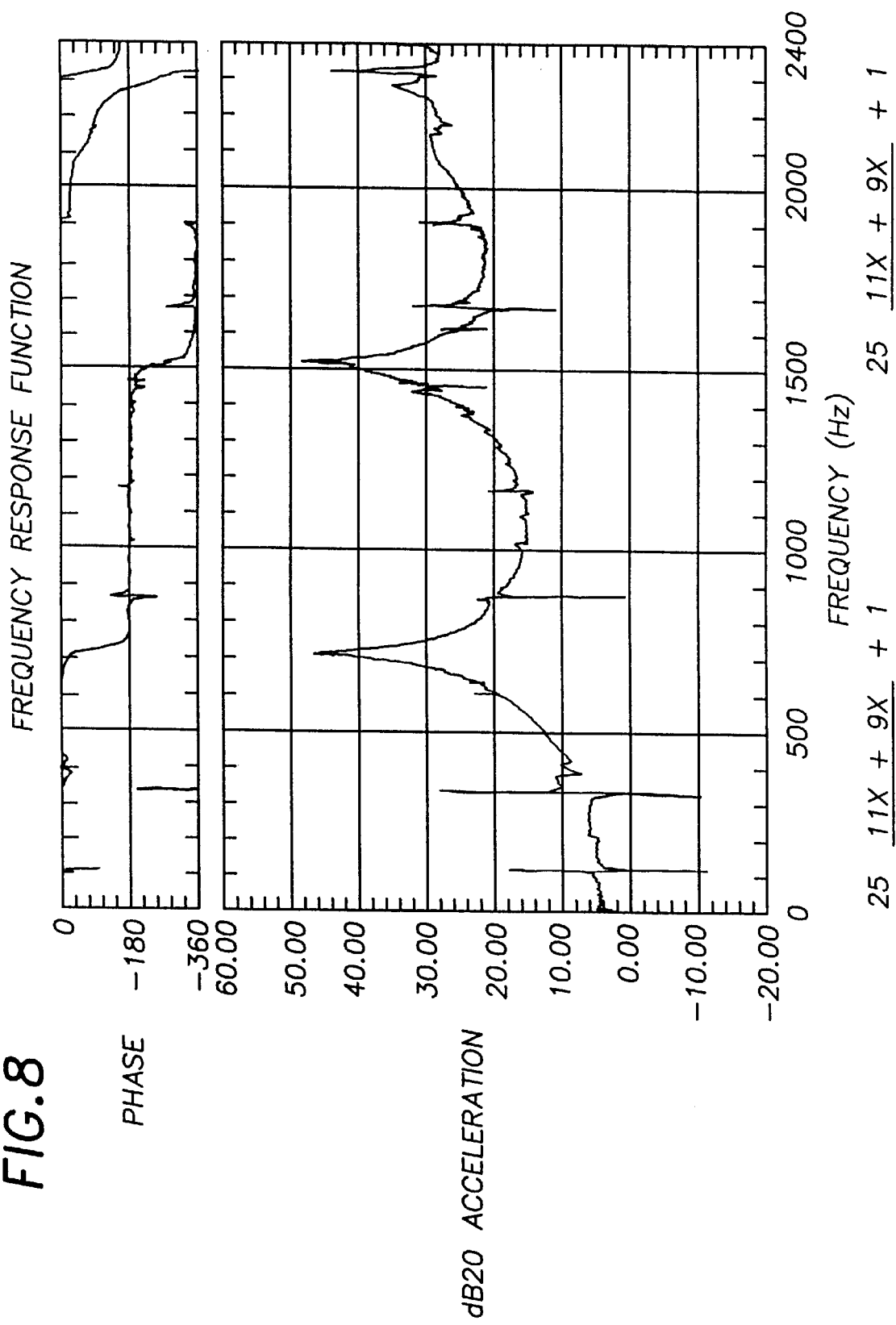
Figure 9:
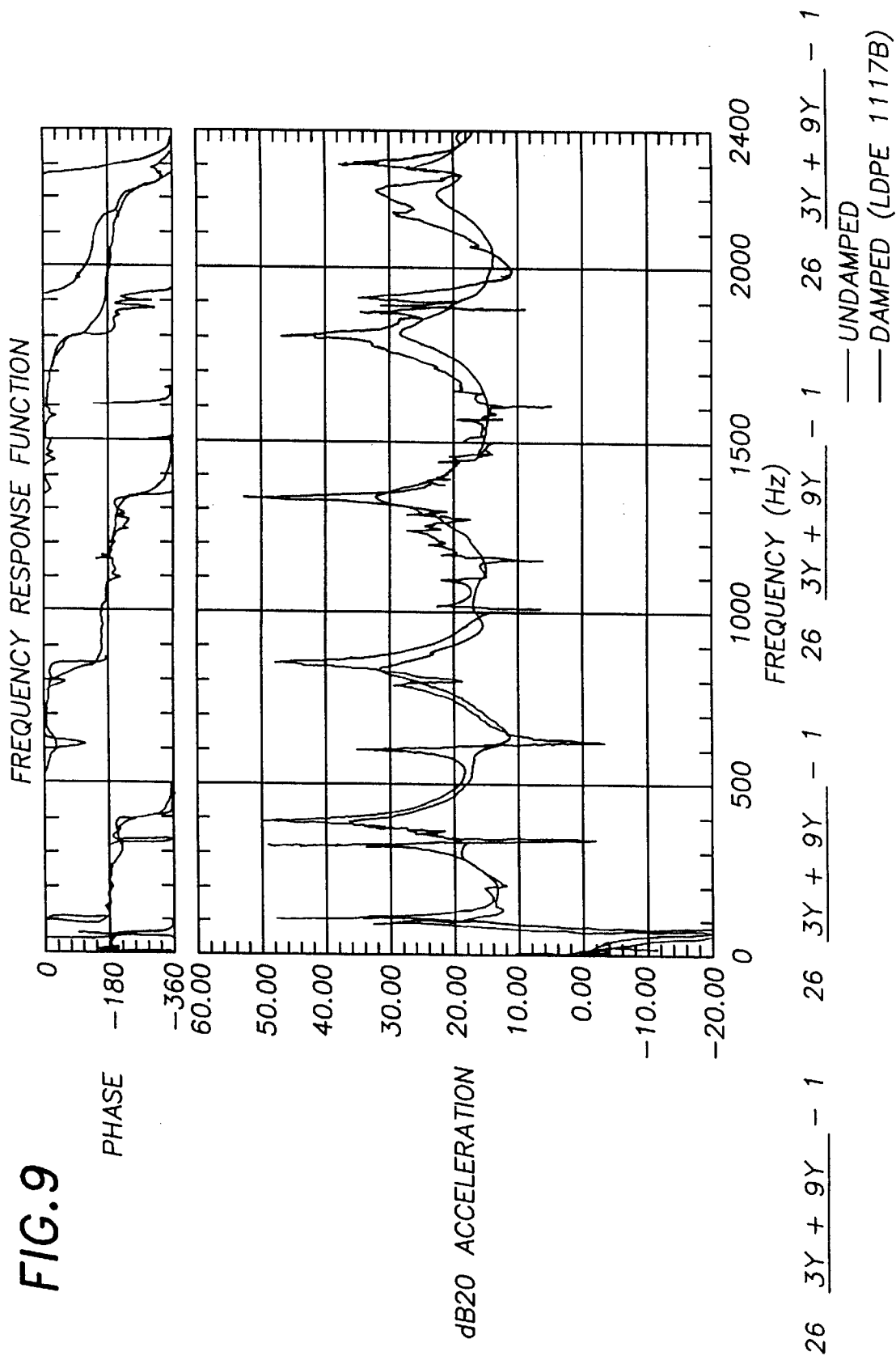
FIGS. 9–12 are graphs showing the comparison of damped and undamped transfer accelerance functions.
Figure 10:
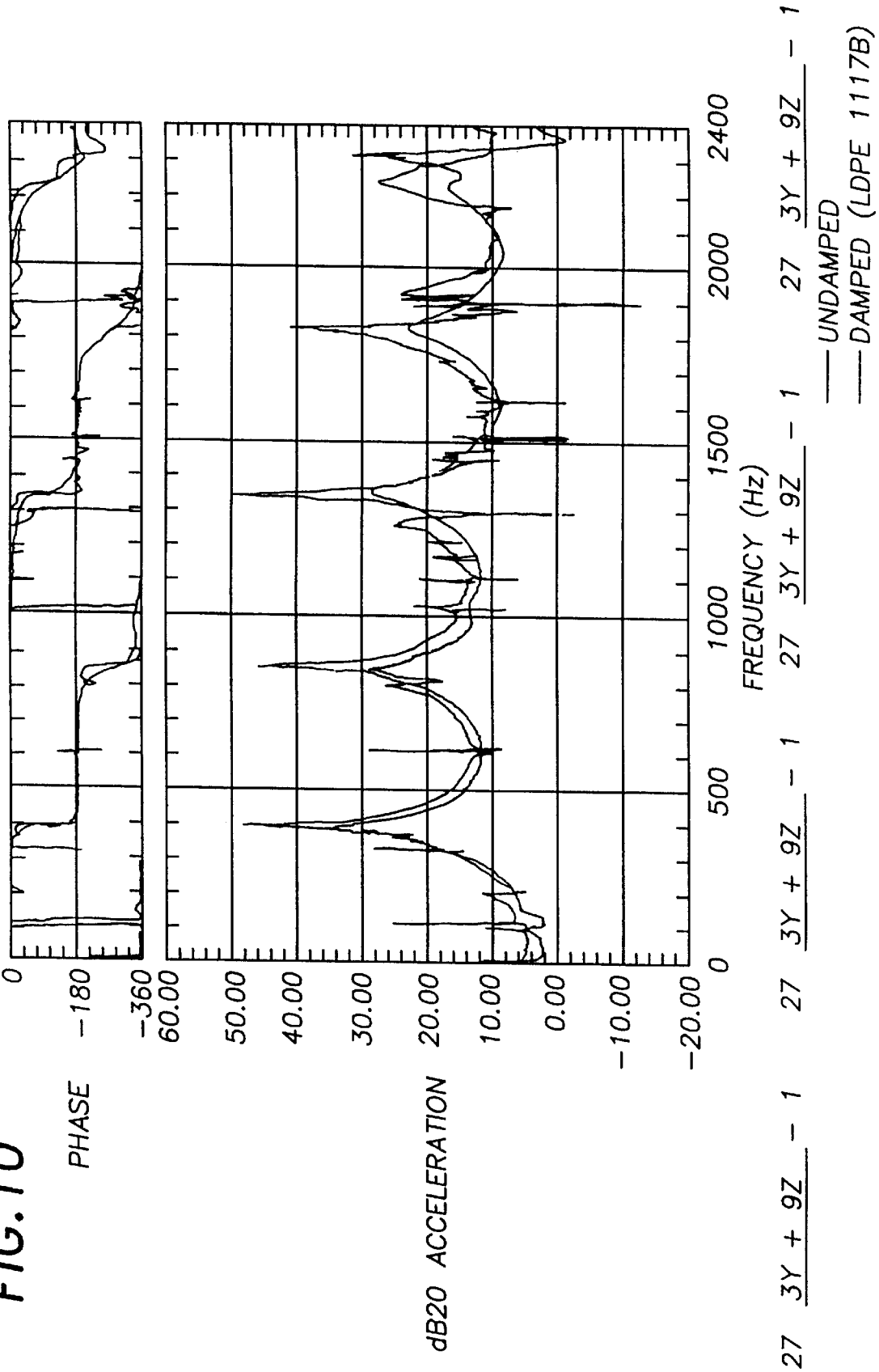
Figure 11:
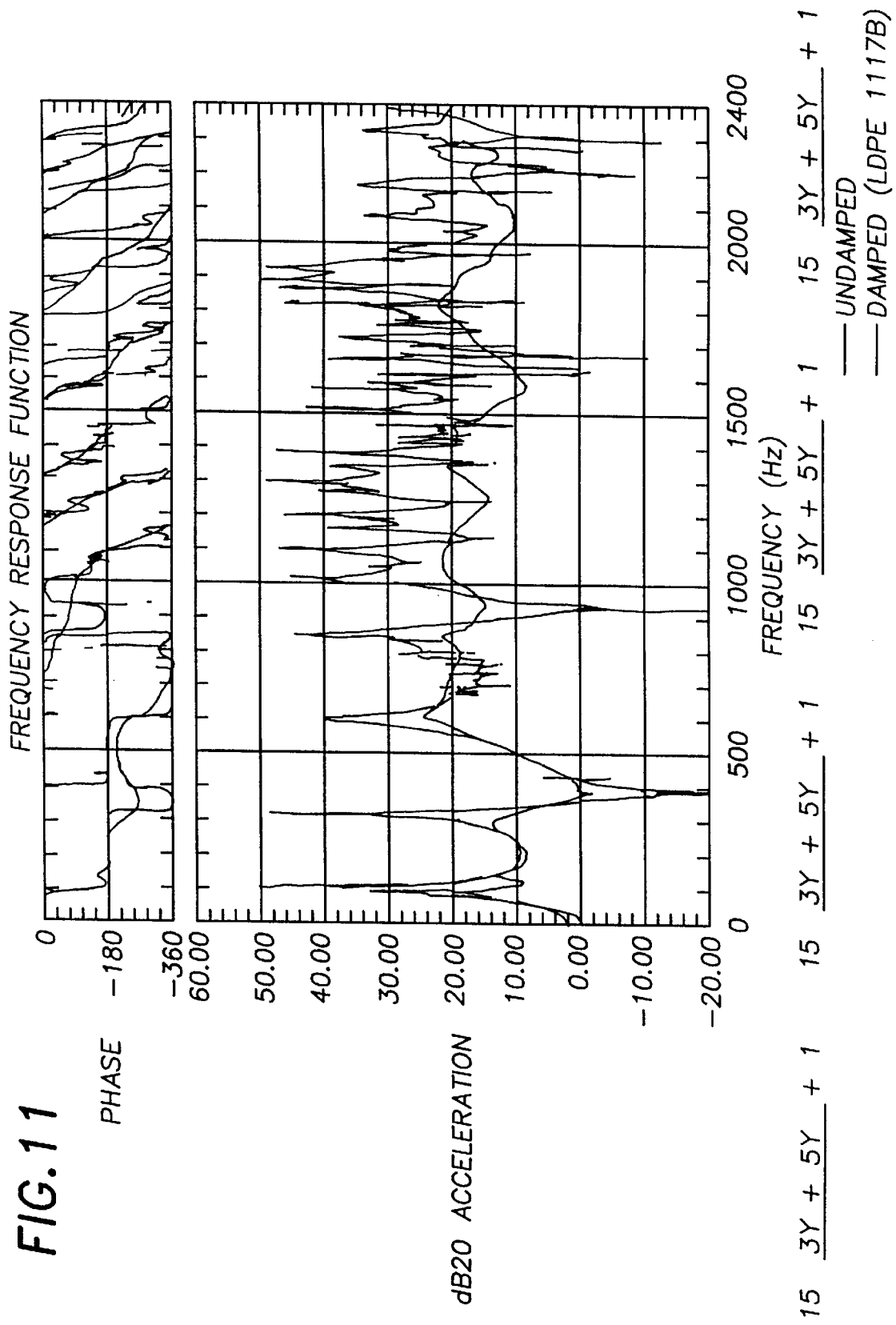
Figure 12:
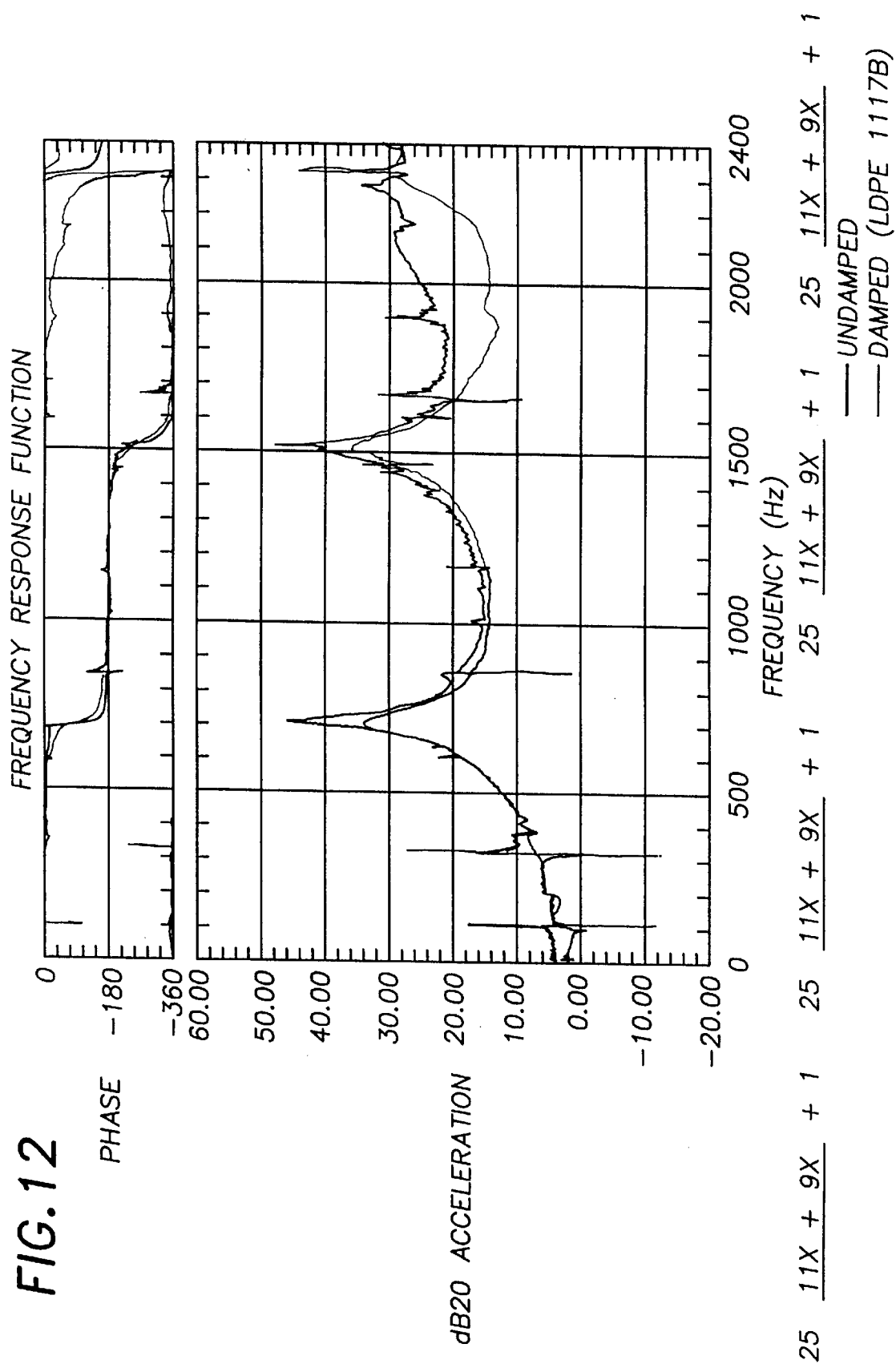

Accelerance frequency response functions were measured at each of the 30 response locations for each direction of drive over the frequency range of 0.0 Hz to 2,400 Hz with 0.5 Hz frequency spacing. Data were collected first on the empty fixture 16 to provide an undamped baseline for comparison. An experimental modal analysis was then conducted to extract the pertinent modal parameters including modal frequency, damping and mode shape. FIGS. 5, 6 and 7 show samples of typical measured accelerance from the vertical drive case on the empty fixture 16. FIGS. 5 and 6 show transfer accelerances on the far end mass in two directions and FIG. 7 shows a transfer response in the normal direction on the box beam wall. FIG. 8 shows the transfer response in the axial direction for the axial drive case. As evidenced by the high Q resonant responses in these data, the inherent damping in the fixture 16 is quite low as would be expected.

Following the baseline tests, LDPE 1117B beads 19 were installed into the fixture 16. The beads 19 were installed with the fixture 16 in a vertical orientation by removing a threaded cap (not shown) and pouring the materials in while continuously impacting the fixture with a mallet to facilitate the packing process. As the material settled, additional material was added until no further settling was noted after several impacts. In each case the fixture was filled to the base of the fill hole with the plug installed flush to the outside surface of the end plate. No additional overpressure was applied to the fill material. The total weight of the installed bead material was 66 pounds, compared to the 250 pounds for the empty fixture 16. Thus, the damping material increased the weight of the fixture approximately 26%. For reference, the use of sand in place of the polyethylene beads would have increased the weight of the beam in the range of 70–95% depending on the granular mix employed.

FIGS. 9–12 overlay the transfer function shown for the baseline configuration (no damping) with the corresponding transfer function obtained with the LDPE beads 19 added. The results for the vertical drive case clearly show that the damping has been significantly increased across the full frequency range but most particularly in the lowest fundamental modes of vibration. A study of the mode shapes reveals that the damping effectiveness, while substantial for most modes, was particularly prominent in the low order bending modes of the fixture 16. Torsional modes and compressional modes were not as heavily damped as the bending modes, but were still significantly damped. It is also evident from the response on the box section wall that the local cross-sectional modes have for practical purposes been eliminated, leaving only heavily damped groups of global modes in this frequency range. These data show that the loss factors associated with the bending modes are quite high in the lowest modes and decrease to a more moderate level at higher frequencies while the loss factors for the torsional and axial modes are more constant with frequency. This result is significant in that it is contrary to the general trend in damping effectiveness associated with most applied damping treatments, such as free or constrained layer damping tiles, whose effectiveness slowly increases with increasing frequency and mode number. Thus, the approach of the present invention can provide a means to impart much higher damping to the low frequency modes of a built-up structure, which have been historically difficult to damp. This difference suggests that the damping mechanism of the present invention is different from the viscoelastic shear mechanism in tiles.

EXAMPLE 3

Figure 13:
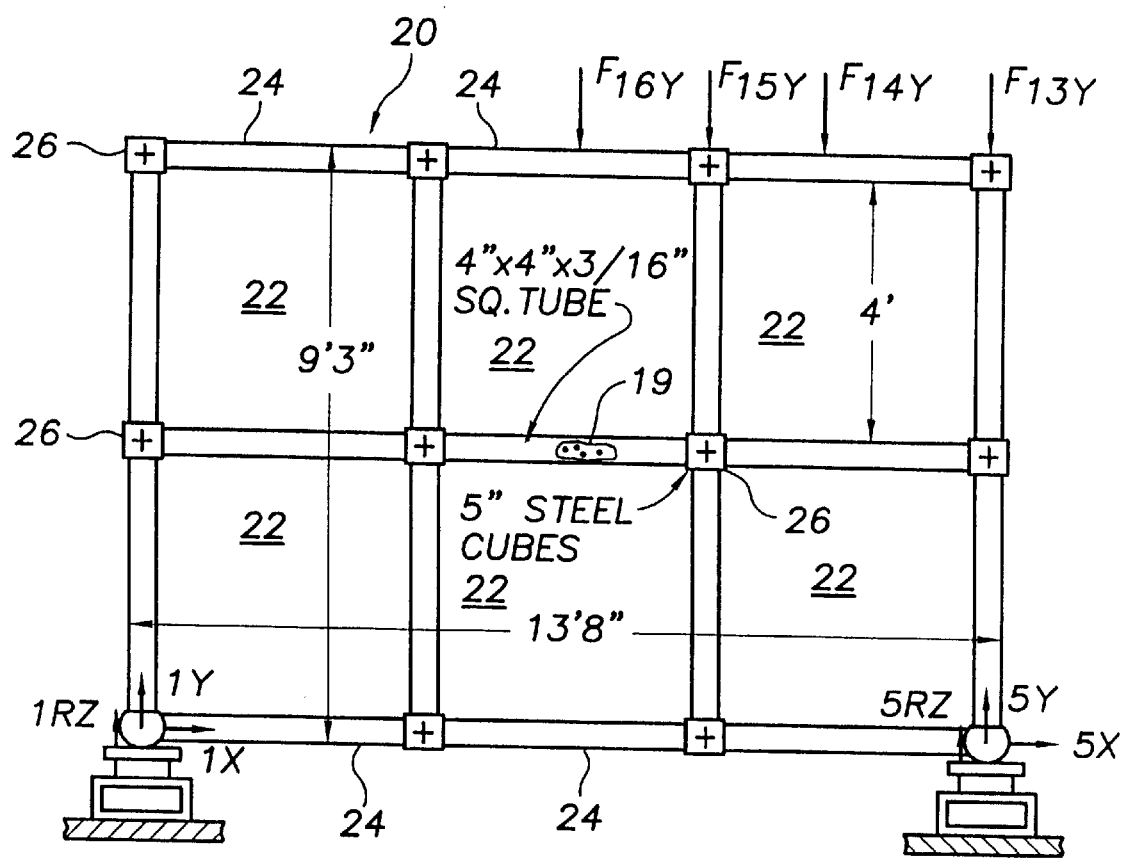
FIG. 13 is a schematic illustration of yet another test rig.

This example relates to a more complicated two-dimensional truss structure and was also carried out at Carderock Division Naval Surface Warfare Center in Bethesda, Md. FIG. 13 is a schematic illustration of the experimental truss. The truss 20 includes six square cells 22 constructed from 4 inch×4 inch×48 inch long square tubes 24 with 5 inch×5 inch×5 inch solid steel blocks 26 at each joint. The truss 20 was isolated on two 4 Hz Firestone-116 air mounts from the isolated seismic mass. Each square tube 24 was drilled and fitted with a one inch threaded plug through which the LDPE beads 19 were loaded. As with the structure of Example 2, the structure of Example 3 was continuously impacted during bead installation to facilitate settling and compaction. Each tube 24 was filled until no further settling was noted and no overpressure was applied to the beads. The introduction of the beads into the truss resulted in a 20% increase in its mass.

Figure 14:
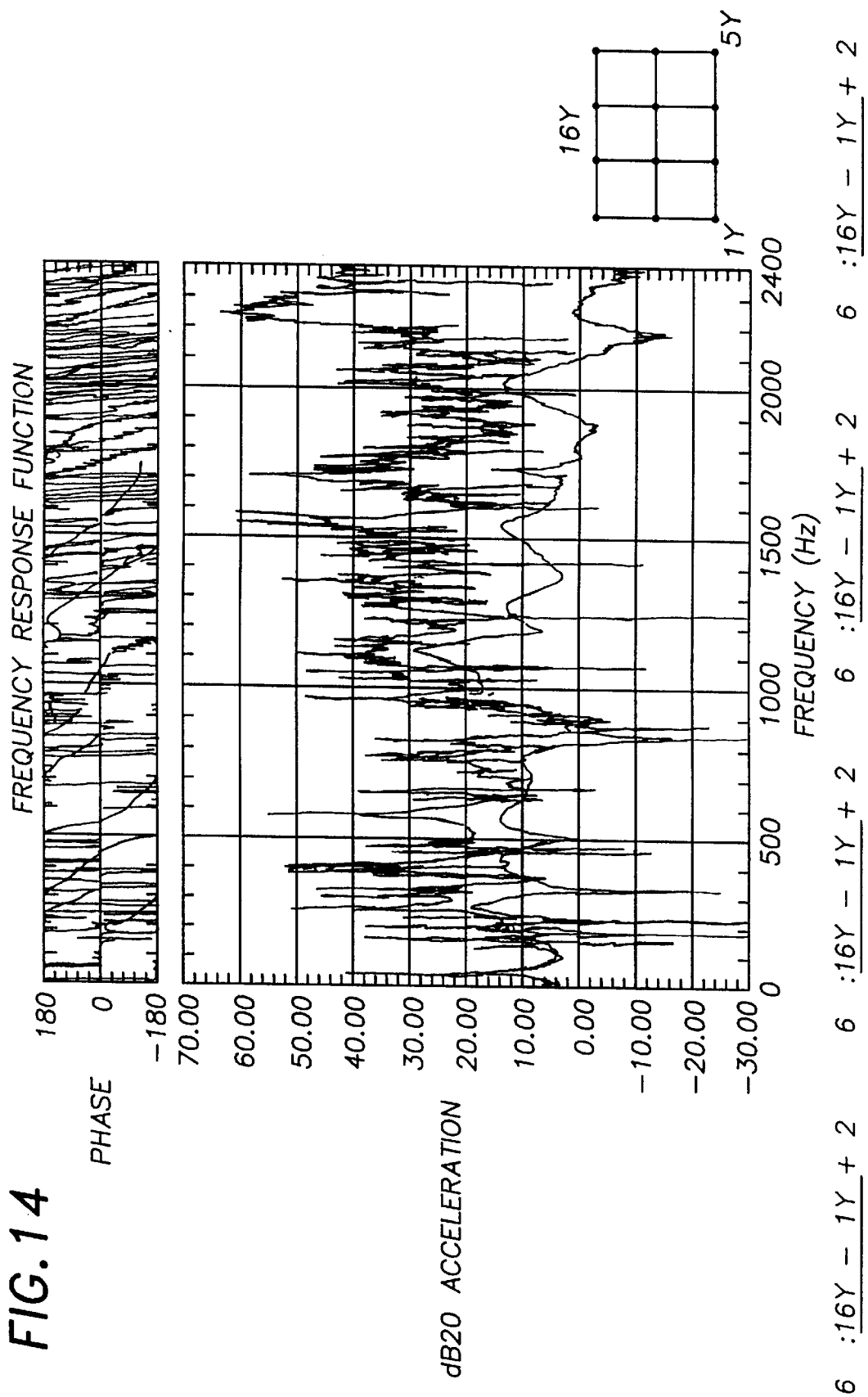
FIGS. 14–17 are graphs comparing damped and undamped response of a two-dimensional truss.
Figure 15:
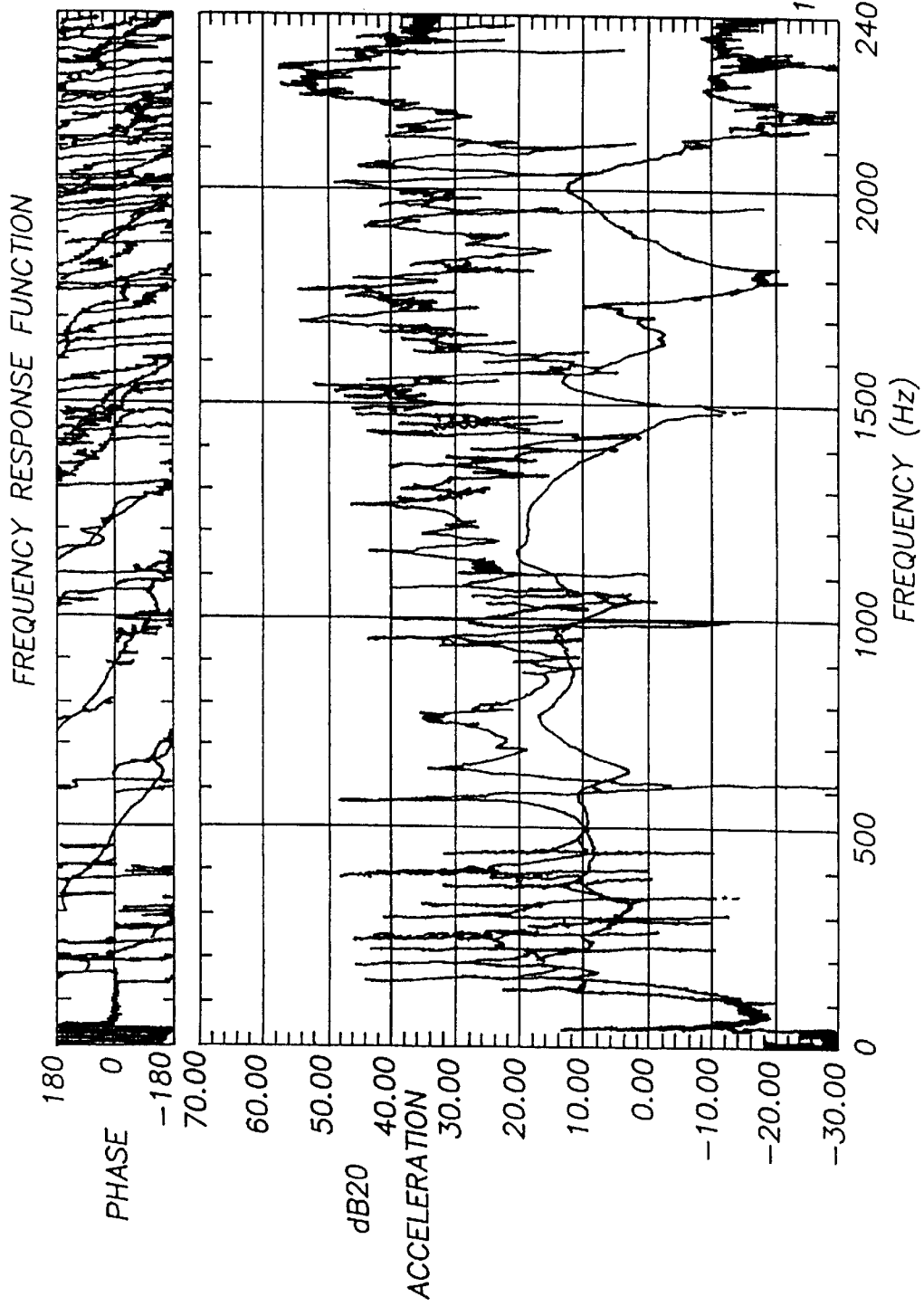

The truss 20 was driven vertically (in-plane) at four locations across the top of the structure. Drive point response accelerances were measured for each drive in addition to transfer accelerances at the two mount locations. Both translational and rotational response components were measured at each mount location by summing and differencing measured accelerances from a set of four tri-axial accelerometers above each mount location. Measurements were obtained across the frequency range of 0–2,400 Hz with a frequency spacing of 0.5 Hz. FIGS. 14 and 15 show the vertical and rotational response measurements obtained at output point 1 for the symmetric drive at 16Y. Both measurements are compared to the corresponding baseline "undamped" response functions. From these data it is quite evident that the lightly damped, modally dense response of the baseline structure has been dramatically affected above about 150 Hz, with many modes virtually eliminated and others reduced to broad, low Q peaks. Below 150 Hz the truss 20 response is driven by the first three global in-plane bending modes of the truss (two of which are not evident for the symmetric drive case). These modes appear unaffected by the bead damping. However, above 150 Hz, the effect on the modal characteristics of the system is clear. Besides the differences in magnitudes, the transfer function phases also indicate that the response of the structure has gone from that of a highly reverberant system (phase dominated by modal response) to a system whose phase now resembles a simple propagation time delay (a linear phase shift with increasing frequency).

Figure 16:
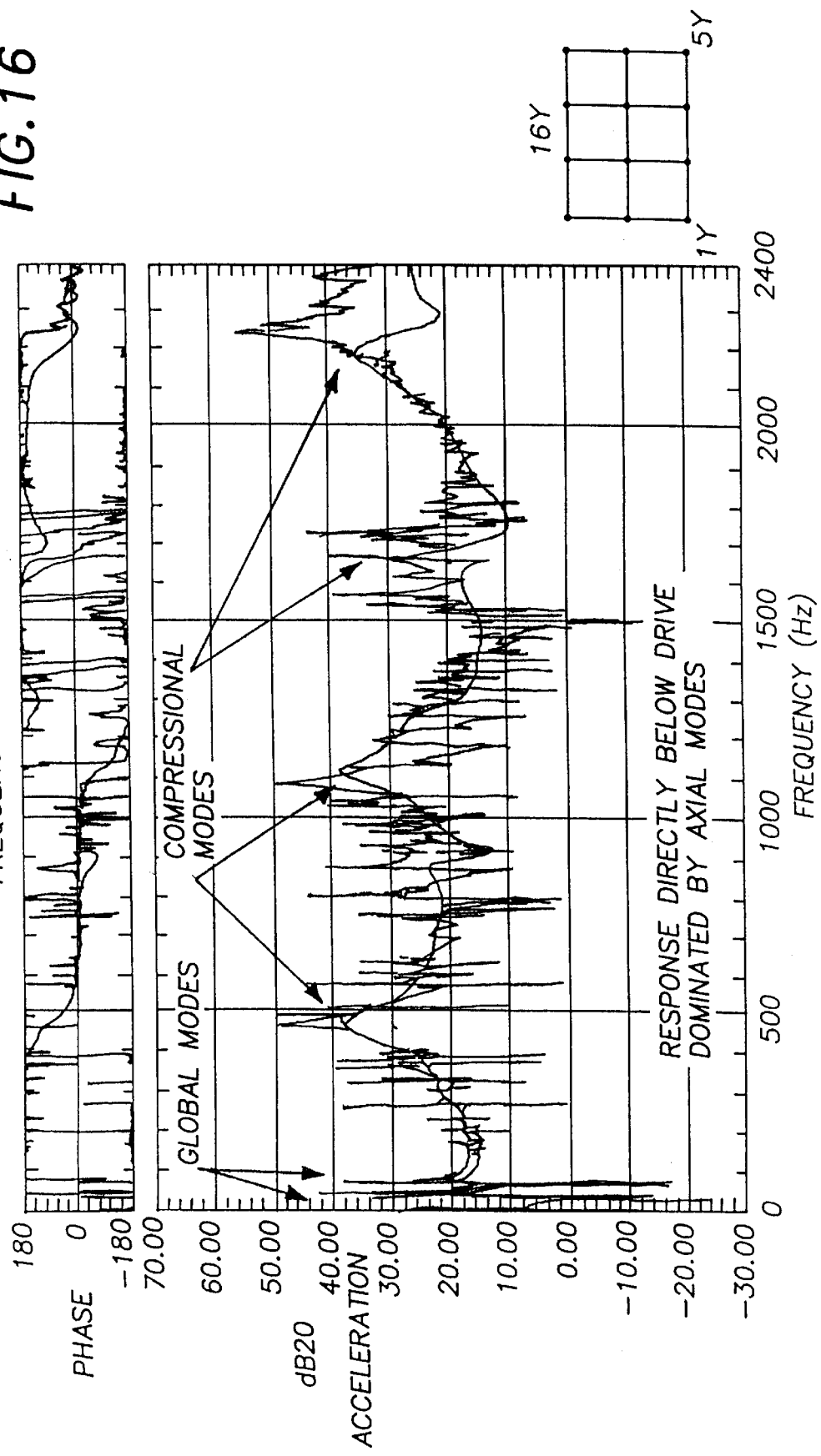
Figure 17:
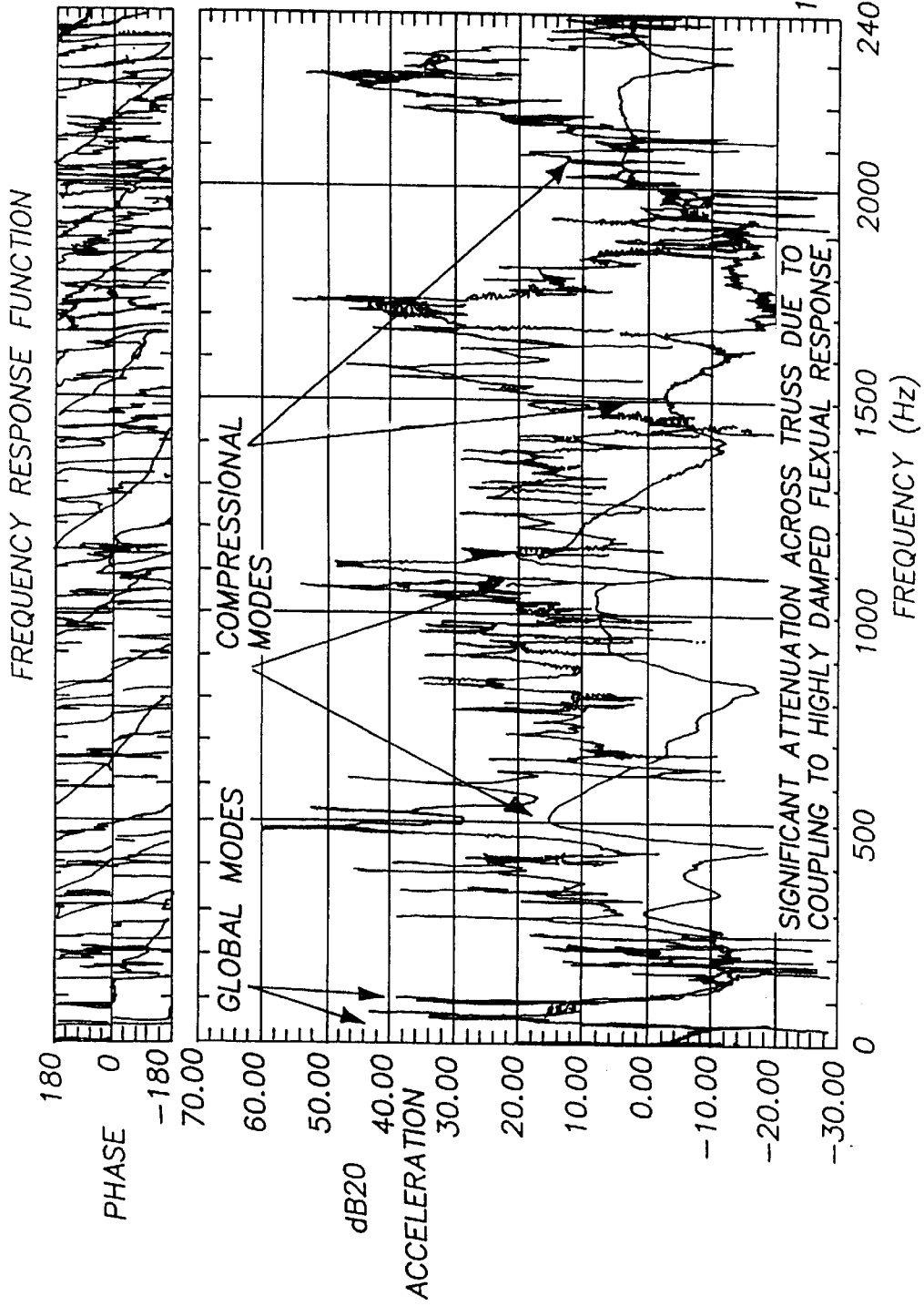
Figure 18:
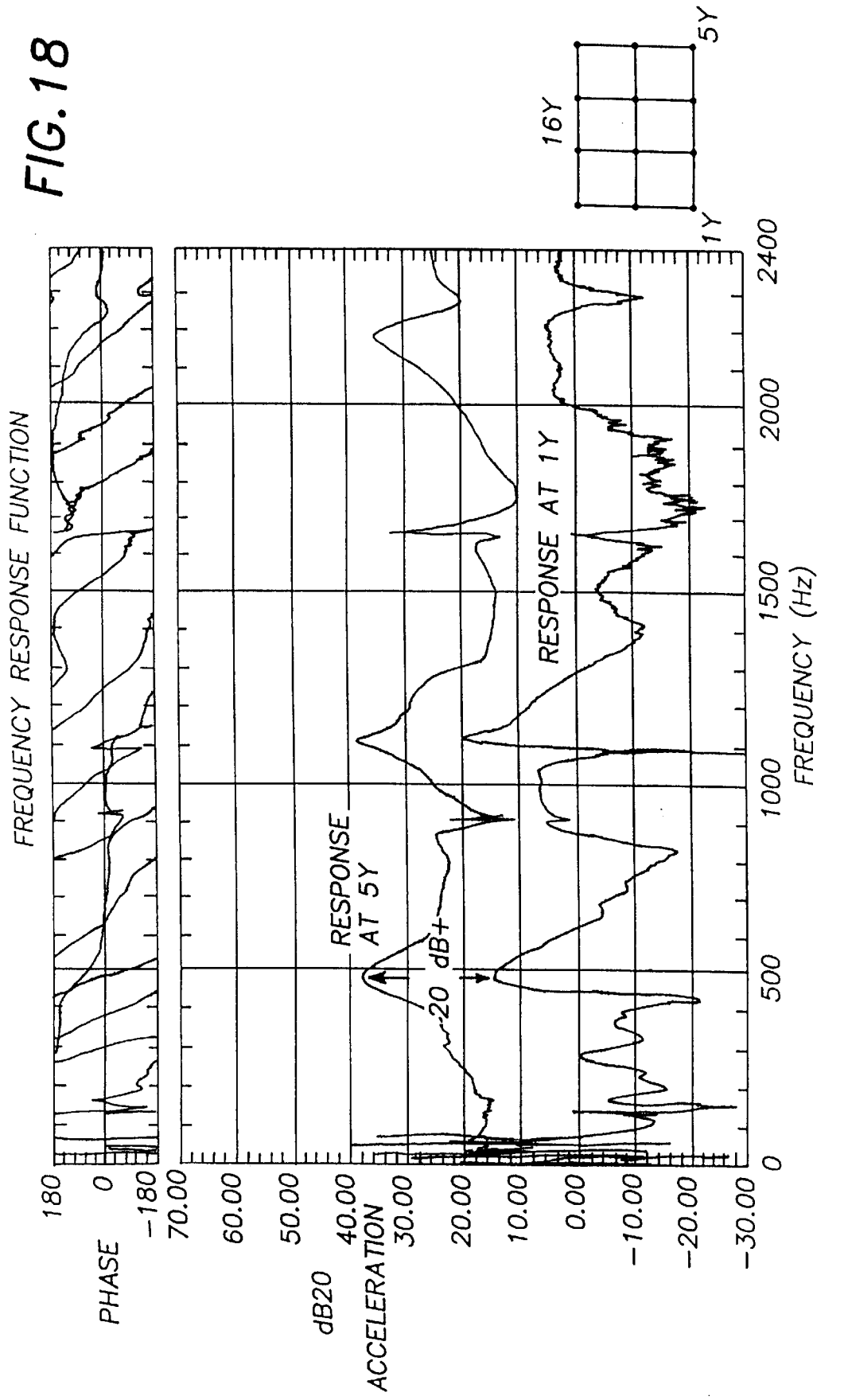
FIG. 18 comprises graphs showing attenuation across a truss.

FIGS. 16–18 show the results obtained for the drive at 13Y directly into the compressional stiffness of the outer vertical member. The transfer functions in this case represent the vertical responses at both mount locations. Based on the results of modal testing conducted prior to the damping evaluation, it was known that the truss response was dominated in several frequency bands by clusters of modes whose dominant feature included compressional response in vertical members. In these bands as well as at other resonance frequencies, the resonant amplitudes at the mount locations were nearly equal, differing only in phase. In this case the three fundamental bending modes of the truss can be clearly observed below 150 Hz. Above 150 Hz it appears, as in the previous example, that a majority of the modes have been effectively damped out of existence, leaving a series of heavily damped modes which appear to be the compressional modes of the driven member. FIG. 17 shows the vertical response at location 1Y at the other end of the truss. The significant feature of this plot, besides the high level of modal damping, is the drastic reduction in the levels noted across the range. Noting the earlier discussion regarding the resonant amplitudes at the mount locations, it is clear from these two comparisons that there is now a significant attenuation across the truss structure. FIG. 18 shows a comparison of damped response amplitudes at the two mount locations (one near the drive, the other removed from the drive) which show a consistent 20 dB to 30 dB attenuation through the structure. As with the previous drive example, the difference in phase between the response at the driven end (5Y) and the response at the other end (1Y) suggests that the beads have virtually destroyed the modal characteristics of the structure such that resonant response is found only in the driven member and beyond that, the response reduces to a series of propagating waves.

The test results disclosed herein make it clear that the LDPE beads, when installed within the cavity of tubular truss members, provide a significant degree of damping across a wide band of frequencies. Most notable, however, is the potential to obtain high loss factors in the lowest modes of the individual truss elements. Given the number of sources active in this frequency range, the ability to dissipate energy within the truss structure before it reaches the isolation system and the ability to reduce the resonant amplitudes of the truss modes is a considerable benefit in reducing the potential for acoustic deficiencies. As noted earlier, the effectiveness of this damping approach on the low frequency modes is one of the prime factors which sets its apart from other damping techniques such as free or constrained layer tiles. Additionally, the low weight of these beads as compared to material such as sand is also of significant benefit.

The data make it clear that the mechanism responsible for the damping effectiveness of the beads differs from that of other more conventional approaches. At present, several different mechanisms are believed to be responsible for the damping including bead-to-bead and bead-to-beam friction, bead deformation (both resonant and non-resonant), and momentum transfer or impact between beads. Based on previous work, the leading hypothesis for the damping mechanism of the present invention attributes the effectiveness to a thickness resonance effect within the bead matrix which couples primarily to the bending modes of the beam. The thickness resonance, which occurs at a surprisingly low frequency, is made possible by the low composite wave speed of the bead matrix resulting from the reduction in the effective bulk modulus of the material. This effect would give rise to a tuned absorber-like effect which could explain the low damping effectiveness at low frequency order observed in these tests.

It is recognized that variations and modifications of the present invention will occur to those skilled in the art and it is intended that all such modifications and variations be included within the scope of the appended claims.

What is claimed is:

1. Method for damping vibration in a structure comprising:
   placing nonspherical granular material into intimate contact with the structure wherein particles of the granular material are in intimate contact with each other, the granular material having a bulk specific gravity less than one.
2. The method of claim 1 wherein the material is low density polyethylene.
3. The method of claim 1 wherein the material is glass microspheres.
4. The method of claim 1 wherein the structure is a hollow member and the material fills the hollow member.
5. The method of claim 1 wherein the structure is an open beam and further comprising confining the granular material for contact with the open beam.
6. Damped structural member comprising:
   a structural member; and
   nonspherical granular material having a bulk specific gravity less than one in intimate contact with the member wherein particles of the granular material are in intimate contact with each other.
7. The structural member of claim 6 wherein the member is hollow and granular material fills the hollow member.

8. The structural member of claim 6 wherein the member is an open member and further including structure for maintaining the granular material in contact with the open member.

9. The structural member of claim 6 wherein the granular material is low density polyethylene.

10. The structural member of claim 6 wherein the granular material is glass microspheres.

11. Method for damping vibration in a structure comprising:
coupling nonspherical granular material to the structure wherein particles of the granular material are in intimate contact with each other, the granular material having a bulk specific gravity less than one.

12. Method for damping vibration in a structure comprising:
coupling nonspherical granular material to the structure wherein particles of the granular material are in intimate contact with each other, the granular material being substantially non-viscoelastic.

13. The method of claim 11 or claim 12 wherein the structure is a beam.

14. The method of claim 11 or claim 12 wherein the structure is an enclosed beam.

15. The method of claim 11 or claim 12 wherein the structure is excited at at least one drive point.

16. The method of claim 11 or claim 12 wherein the structure is a beam with members attached thereto.

17. Damped structural member comprising:
a structural member; and
nonspherical granular material having a bulk specific gravity less than one coupled to the member wherein particles of the granular material are in intimate contact with each other.

18. Damped structural member comprising:
a structural member; and
nonspherical granular, substantially non-viscoelastic material coupled to the member wherein particles of the granular material are in intimate contact with each other.

19. The damped structural member of claim 17 or claim 18 wherein the member is a beam.

20. The damped structural member of claim 17 or claim 18 wherein the member is an enclosed beam.

21. The damped structural member of claim 17 or claim 18 wherein the member is excited at at least one drive point.

22. The damped structural member of claim 17 or claim 18 wherein the member is a beam with members attached thereto.

23. Method for damping vibration in a structure comprising:
placing nonspherical granular material into intimate contact with the structure wherein particles of the granular material are in intimate contact with each other, the granular material having a bulk specific gravity less than 1.5.

24. Damped structural member comprising:
a structural member; and
nonspherical granular material having a bulk specific gravity less than 1.5 in intimate contact with the member wherein particles of the granular material are in intimate contact with each other.

25. Method for damping vibration in a structure comprising:
coupling granular material composed of nonsolid granules to the structure wherein particles of the granular material are in intimate contact with each other, the granular material having a bulk specific gravity less than 1.5.

26. Method for damping vibration in a structure comprising:
coupling granular glass to the structure wherein particles of the granular glass are in intimate contact with each other, the granular glass having a bulk specific gravity less than 1.5.

27. Method for damping vibration in a structure comprising:
coupling granular material composed of nonsolid granules to the structure wherein particles of the granular material are in intimate contact with each other, the granular material being substantially non-viscoelastic.

28. Method for damping vibration in a structure comprising:
coupling granular glass to the structure wherein particles of the granular material are in intimate contact with each other, the granular glass being substantially non-viscoelastic.

29. Damped structural member comprising:
a structural member; and
granular material composed of nonsolid granules having a bulk specific gravity less than 1.5 coupled to the member wherein particles of the granular material are in intimate contact with each other.

30. Damped structural member comprising:
a structural member; and
granular glass having a bulk specific gravity less than 1.5 coupled to the member wherein particles of the granular glass are in intimate contact with each other.

31. Damped structural member comprising:
a structural member; and
granular material composed of substantially non-viscoelastic nonsolid granules coupled to the member wherein particles of the granular material are in intimate contact with each other.

32. Damped structural member comprising:
a structural member; and
substantially non-viscoelastic granular glass coupled to the member wherein the particles of the granular glass are in intimate contact with each other.

* * * * *